US011655342B2

(12) United States Patent
Hsieh

(10) Patent No.: US 11,655,342 B2
(45) Date of Patent: May 23, 2023

(54) MODIFIED POLYMETHYLHYDROSILOXANE, TERMINAL MODIFIED CONJUGATED DIENE-VINYL AROMATIC HYDROCARBON COPOLYMER AND SYNTHESIS METHOD FOR WHICH, RUBBER COMPOSITION AND TIRE

(71) Applicant: Chi Mei Corporation, Tainan (TW)

(72) Inventor: Kuan-Lin Hsieh, Tainan (TW)

(73) Assignee: CHIMEI CORPORATION, Tainan (TW)

( * ) Notice: Subject to any disclaimer, the term of this patent is extended or adjusted under 35 U.S.C. 154(b) by 238 days.

(21) Appl. No.: 17/124,588

(22) Filed: Dec. 17, 2020

(65) Prior Publication Data

US 2021/0198431 A1  Jul. 1, 2021

(30) Foreign Application Priority Data

Dec. 31, 2019  (TW) .................................. 108148749

(51) Int. Cl.
| | | |
|---|---|---|
| *C08G 77/38* | (2006.01) | |
| *C08G 77/12* | (2006.01) | |
| *C08G 77/18* | (2006.01) | |
| *C08K 3/04* | (2006.01) | |
| *B60C 1/00* | (2006.01) | |
| *C08F 8/02* | (2006.01) | |
| *C08L 15/00* | (2006.01) | |
| *C08F 236/10* | (2006.01) | |
| *C08C 19/44* | (2006.01) | |

(52) U.S. Cl.
CPC ................ *C08G 77/38* (2013.01); *B60C 1/00* (2013.01); *C08F 8/02* (2013.01); *C08F 236/10* (2013.01); *C08G 77/12* (2013.01); *C08G 77/18* (2013.01); *C08K 3/04* (2013.01); *C08L 15/00* (2013.01); *C08C 19/44* (2013.01)

(58) Field of Classification Search
CPC ........ C08G 77/38; C08G 77/12; C08G 77/18; C08K 3/04; B60C 1/00; C08F 8/02; C08L 15/00
USPC .......................................................... 524/156
See application file for complete search history.

(56) References Cited

U.S. PATENT DOCUMENTS

| | | | |
|---|---|---|---|
| 8,907,023 B2 | 12/2014 | Hsieh et al. | |
| 10,486,468 B2 | 11/2019 | Tai et al. | |
| 10,889,659 B2 | 1/2021 | Shen et al. | |
| 2018/0171110 A1 | 6/2018 | Tai et al. | |
| 2019/0241740 A1* | 8/2019 | Shen .................... | C08G 77/442 |

FOREIGN PATENT DOCUMENTS

| | | |
|---|---|---|
| CN | 103910884 A | 7/2014 |
| CN | 110117365 A | 8/2019 |
| TW | 201823345 A | 7/2018 |
| TW | I669315 B | 8/2019 |

OTHER PUBLICATIONS

CN Office Action dated Mar. 16, 2022 in Chinese application No. 202011492150.0.

* cited by examiner

*Primary Examiner* — Deve V Hall
(74) *Attorney, Agent, or Firm* — McClure, Qualey & Rodack, LLP

(57) ABSTRACT

A modified polymethylhydrosiloxane, a terminal modified conjugated diene-vinyl aromatic hydrocarbon copolymer and a synthesis method for which, a rubber composition and a tire are provided. The modified polymethylhydrosiloxane includes a compound represented by a formula (1).

E is a moiety containing an epoxide group. T is a moiety containing an alkoxysilylalkyl group. A is selected from the group consisting of hydrogen, a moiety containing an alkyl group and a moiety containing an amino group. B is a moiety containing an aryl group. G is a moiety containing an ethyleneoxy group and an alkoxy group. J is a moiety containing an ethyleneoxy group and a hydroxyl group. $e=5-45$. $t=1-4$. $a+b+g+j$ is equal to 1 to 595.

13 Claims, No Drawings

MODIFIED POLYMETHYLHYDROSILOXANE, TERMINAL MODIFIED CONJUGATED DIENE-VINYL AROMATIC HYDROCARBON COPOLYMER AND SYNTHESIS METHOD FOR WHICH, RUBBER COMPOSITION AND TIRE

This application claims the benefit of Taiwan application Serial No. 108148749, filed Dec. 31, 2019, the subject matter of which is incorporated herein by reference.

BACKGROUND

Technical Field

The disclosure relates to a modified polymethylhydrosiloxane, and particularly relates to a modified polymethylhydrosiloxane used for synthesizing a terminal modified conjugated diene-vinyl aromatic hydrocarbon copolymer, and a method for synthesizing the terminal modified conjugated diene-vinyl aromatic hydrocarbon copolymer with applying the modified polymethylhydrosiloxane, and the terminal modified conjugated diene-vinyl aromatic hydrocarbon copolymer manufactured by this method and an application of which.

Description of the Related Art

A conjugated diene-vinyl aromatic hydrocarbon copolymer can be applied for manufacturing tires. For tires, rolling resistance and wet skid resistance are crucial factors to save energy consumption and increase driving safety. Currently, carbon black is added to the modified copolymer of conjugated diene and vinyl aromatic hydrocarbon to increase the strength of the tires.

However in recent years, due to the depletion of oil resource and the global warming issue, the tire industry replaces carbon black with white carbon (main component thereof is silica ($SiO_2$)) with an aim of improving the rolling resistance of the tires and therefore reducing energy loss. In comparison with carbon black, white carbon is more difficult to be uniformly distributed in a conjugated diene-vinyl aromatic hydrocarbon copolymer. Therefore, compatibility and mixing homogeneity between silica and a modified copolymer of conjugated diene and vinyl aromatic hydrocarbon need to be further improved. Therefore, obtaining a conjugated diene-vinyl aromatic hydrocarbon copolymer having high blending compatibility with white carbon, and a tire manufactured with using the polymer described above having low rolling resistance and excellent wet skid resistance are the goals one skilled in the art wants to achieve.

SUMMARY

In an embodiment of the present disclosure, a modified polymethylhydrosiloxane is disclosed. The modified polymethylhydrosiloxane comprises a compound represented by a formula (1).

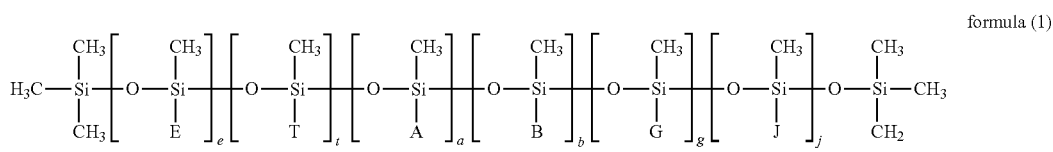

formula (1)

E is a moiety containing an epoxide group. T is a moiety containing an alkoxysilylalkyl group. A is selected from the group consisting of hydrogen, a moiety containing an alkyl group, and a moiety containing an amino group. B is a moiety containing an aryl group. G is a moiety containing an ethyleneoxy group and an alkoxy group. J is a moiety containing an ethyleneoxy group and a hydroxyl group. $e=5\text{-}45$. $t=1\text{-}4$. $a+b+g+j$ is equal to 1 to 595. The moieties E are identical or different. The moieties T are identical or different. The moieties A are identical or different. The moieties B are identical or different. The moieties G are identical or different. The moieties J are identical or different.

In another embodiment of the present disclosure, a synthesis method for a terminal modified conjugated diene-vinyl aromatic hydrocarbon copolymer is disclosed, comprising the following steps. A polymerization step is performed reacting conjugated diene monomer units with vinyl aromatic hydrocarbon monomer units to yield a conjugated diene-vinyl aromatic hydrocarbon copolymer having an active end. The conjugated diene-vinyl aromatic hydrocarbon copolymer having the active end reacts with a modifier to yield a terminal modified conjugated diene-vinyl aromatic hydrocarbon copolymer. The modifier comprises the modified polymethylhydrosiloxane described above.

In yet another embodiment of the present disclosure, a terminal modified conjugated diene-vinyl aromatic hydrocarbon copolymer is disclosed, comprising a modified conjugated diene-vinyl aromatic hydrocarbon copolymer with a terminal having at least one residue of a modifier. The modifier comprises the modified polymethylhydrosiloxane described above.

In yet more another embodiment of the present disclosure, a rubber composition is disclosed, comprising carbon black, white carbon and the terminal modified conjugated diene-vinyl aromatic hydrocarbon copolymer described above.

In even yet more another embodiment of the present disclosure, a tire is disclosed, comprising the rubber composition described above.

Accordingly, embodiments in the present disclosure provide a modified polymethylhydrosiloxane, and a synthesis method for a terminal modified conjugated diene-vinyl aromatic hydrocarbon copolymer manufactured by using the modified polymethylhydrosiloxane as a modifier, and the terminal modified conjugated diene-vinyl aromatic hydrocarbon copolymer. It is also disclosed at the same time that a rubber composition and a tire manufactured with applying the terminal modified conjugated diene-vinyl aromatic hydrocarbon copolymer. The terminal modified conjugated diene-vinyl aromatic hydrocarbon copolymer provided in embodiments of the present disclosure has excellent wet skid resistance and low rolling resistance, and has great compatibility with carbon black and white carbon, and has good workability, and therefore can be applied for manufacturing a tire having excellent wet skid resistance and low rolling resistance.

The above and other embodiments of the disclosure will become better understood with regard to the following detailed description of the non-limiting embodiment(s).

DETAILED DESCRIPTION

For facilitating understanding the above embodiments and other purposes, characteristics and advantages of the present disclosure, preferred embodiments are disclosed in detail as the following.

In the present disclosure, if a moiety is not specifically specified for being substituted or not, the moiety may be a substituted or un-substituted moiety. For example, "an alkyl group" may mean a substituted or un-substituted alkyl group. In addition, when a moiety is described with a description "$C_X$", it indicates a main chain of the moiety has a carbon atom quantity X.

In the present disclosure, a compound structure may be presented with a skeleton formula sometimes. The skeleton formula can omit a carbon atom, a hydrogen atom and a carbon-hydrogen bond. Of course, if a functional group in a structural formula is explicitly drawn, the structural formula is subject to which.

The present invention provides a modified polymethylhydrosiloxane, and a synthesis method for manufacturing a terminal modified conjugated diene-vinyl aromatic hydrocarbon copolymer with using the modified polymethylhydrosiloxane as a modifier, and the terminal modified conjugated diene-vinyl aromatic hydrocarbon copolymer and applications of which. The method for manufacturing the terminal modified conjugated diene-vinyl aromatic hydrocarbon copolymer comprises the following steps. Firstly a polymerization step is performed reacting conjugated diene monomer units with vinyl aromatic hydrocarbon monomer units in a circumstance in existence of an organic alkali metal compound as an initiator to yield a conjugated diene-vinyl aromatic hydrocarbon copolymer having an active end. Next, a reaction for reacting the conjugated diene-vinyl aromatic hydrocarbon copolymer having the active end with a modifier is performed to yield the terminal modified conjugated diene-vinyl aromatic hydrocarbon copolymer.

Monomers and reagents used for the foregoing manufacturing method are described in detail in the following.

<Organic Alkali Metal Compound>

In some embodiments of the present disclosure, the polymerization reaction for yielding the conjugated diene-vinyl aromatic hydrocarbon copolymer having the active end uses the organic alkali metal compound as the initiator for the polymerization reaction. The initiator may be an alkyl lithium such as ethyl lithium, n-propyl lithium, isopropyl lithium, n-butyl lithium (n-BL), n-pentyl lithium, phenyl lithium, methylphenyl lithium, bis(trimethylsilyl) amide (LiHMDS) or any combination thereof.

<Conjugated Diene Monomer Unit>

In some embodiments of the present disclosure, the conjugated diene monomer units for yielding the conjugated diene-vinyl aromatic hydrocarbon copolymer having the active end may be 1,3-butadiene monomer units, isopentyldiene (IUPAC: 2-methyl-1,3-butadiene) monomer units, 2-phenyl-1,3-butadiene monomer unit, 2,3-dimethyl-1,3-butadiene monomer units, 1,3-hexyldiene monomer units, 1,3-octyldiene monomer units, 1,3-pentyldiene monomer units, 2-ethyl-1,3-butadiene monomer units, 2-methylpentyldiene monomer units, 4-methylpentyldiene monomer units, 2,4-hexyldiene monomer units or any combination thereof.

<Vinyl Aromatic Hydrocarbon Monomer Unit>

In some embodiments of the present disclosure, the vinyl aromatic hydrocarbon monomer units for yielding the conjugated diene-vinyl aromatic hydrocarbon copolymer having the active end may comprise styrene monomer units, α-methylstyrene monomer units, p-methylstyrene monomer units, vinyl toluene monomer units, vinylnaphthalene monomer units, vinylethylbenzene monomer units, vinylxylene monomer units, or a combination thereof. In an embodiment, the conjugated diene monomer unit is 1,3-butadiene, and the vinyl aromatic hydrocarbon monomer unit is styrene.

In some embodiments of the present disclosure, the polymerization reaction of the conjugated diene monomer units may generate a 1,4-structure resulted from 1,4-polymerization, or a 1,2-structure resulted from 1,2-polymerization. The 1,4-structure and the 1,2-structure may co-exist within one molecular chain. The 1,4-structure may be classified in to two types of a cis-type and a trans-type. The 1,2 structure is a structure having a vinyl group at a side chain. The vinyl (1,2) structures may occupy 10% to 90% of the conjugated diene monomer units of an un-modified conjugated diene-vinyl aromatic hydrocarbon copolymer after the polymerization.

In some embodiments, a ratio of the vinyl (1,2) structures occupying the conjugated diene monomer units is substantially 50% to 90%, 55% to 70% preferably. A weight percent of the conjugated diene monomer units occupying the main-chain-modified conjugated diene-vinyl aromatic hydrocarbon copolymer is substantially 74% to 84%. In addition, a weight percent of the vinyl aromatic hydrocarbon monomer units occupying the main-chain-modified conjugated diene-vinyl aromatic hydrocarbon copolymer is substantially 16% to 26%.

In some embodiments of the present disclosure, the polymerization reaction of the conjugated diene monomer units and the vinyl aromatic hydrocarbon monomer units may proceed in existence of a solvent. For example, the solvent may comprise an non-polar solvent comprising a saturated hydrocarbon, an aromatic hydrocarbon, etc., or a combination thereof, for example, an aliphatic hydrocarbon such as pentane, hexane, heptane, etc.; an alicyclic hydrocarbon such as cyclopentane, cyclohexane, methylcyclopentane, methylcyclohexane, etc.; an aromatic hydrocarbon such as benzene, toluene, xylene, etc., or a mixture of which. However, the present disclosure is not limited thereto.

In some embodiments of the present disclosure, the polymerization step further comprises making a polyfunctional vinylbenzene compound reacting with the conjugated diene monomer units and the vinyl aromatic hydrocarbon monomer units in existence of the organic alkali metal compound. The polyfunctional vinylbenzene compound having 0.02 to 0.09 parts by weight based on a total quantity of the conjugated diene monomer units and the vinyl aromatic hydrocarbon monomer units as 100 parts by weight is used. In an embodiment, the polyfunctional vinylbenzene compound may be divinylbenzene, trivinylbenzene, or derivatives thereof. For example, eivinylbenzene and the derivatives thereof may be divinylbenzene, m-divinylbenzene, 2-methoxy-1,3-divinylbenzene or 5-methoxy-1,3-divinylbenzene. For example, trivinylbenzene and derivatives thereof may be 1,2,4-trivinylbenzene or 1,3,5-trivinylbenzene.

<Modifier>

In some embodiments of the present disclosure, the modified polymethylhydrosiloxane used as the modifier comprises a compound represented by a formula (1).

tuted or un-substituted $C_2$-$C_4$ alkylene group may be an ethylene group, a propylene group, or a butylene group, but is not limited thereto. For example, the substituted or un-substituted $C_1$-$C_3$ alkyl group may be a methyl group, an ethyl group, an n-propyl group or an isopropyl group, but is not limited thereto. a may be an integer of 170 to 400. In other words, a=170-400. Otherwise, a=170-370. Otherwise, a=220-350. If the compound represented by the formula (1) has a plurality of the moieties A, the plurality of the moieties A is identical or different.

In some embodiments of the present disclosure, the moiety B may be a substituted or un-substituted $C_6$-$C_{16}$ hydrocarbyl group containing an aryl group B. For example, the moiety B may have a structural formula of —$C_pH_{2p}$—U. p is 0-4. U is a moiety containing an aryl group, for example, a phenyl group, a 4-methylphenyl group, a 4-phenethyl group, a 4-methoxyphenyl group, a 4-propylphenyl group, a 4-n-butylphenyl group, a 4-dibutylphenyl group, or a 4-tributylphenyl group, but is not limited thereto. B may be an integer of 0 to 45. In other words, b=0-45. Otherwise, b=8-45. Otherwise, b=10-40. Otherwise, b=18-24. Otherwise, b=19-23. If the compound represented by the formula formula (1)

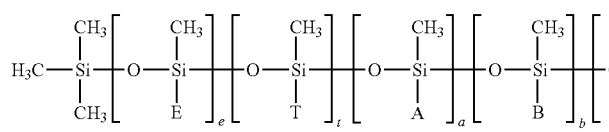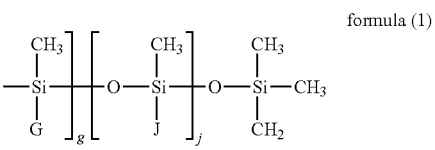

In some embodiments of the present disclosure, the moiety E may be a moiety containing an epoxide group. The moiety E may be a 2-epoxidepropoxyethyl group, a 3-epoxidepropoxypropyl group, a 4-epoxide propoxybutyl group, a 5-epoxidepropoxypentyl group, a 2-(3,4-epoxidecyclohexyl)ethyl group, a 3-(3,4-epoxidecyclohexyl)propyl group or a 4-(3,4-epoxidecyclohexyl)butyl group or any combination thereof. e may be an integer of 5 to 45. In other words, e=5-45. Otherwise, e=8-35. Otherwise, e=10-30. Otherwise, e=19-25. Otherwise, e=19-24. If the compound represented by the formula (1) has a plurality of the moieties E, the plurality of the moieties E is identical or different.

In some embodiments of the present disclosure, the moiety T may be a moiety containing an alkoxysilylalkyl group. The moiety T may be a: trimethoxysilylethyl group, a trimethoxysilylpropyl group, a trimethoxysilyl butyl group, a trimethoxysilylpentyl group, a triethyleneoxysilylethyl group, a triethyleneoxysilylpropyl group, a triethyleneoxysilylbutyl group, a methyl dimethoxysilylethyl group, a tolylmethylsilylpropyl group, a dimethylmethoxysilylethyl group, a dimethylmethoxysilylpropyl group, or any combination thereof. t may be an integer of 1 to 4. In other words, t=1-4. Otherwise, t=2-4. Otherwise, t=3-4. If the compound represented by the formula (1) has a plurality of the moieties T, the plurality of the moieties T is identical or different.

In embodiments, a+b+g+j is equal to 1 to 595. That is, a total value of a, b, g and j is from 1 to 595.

A may be selected from the group consisting of hydrogen, a moiety containing an alkyl group, and a moiety containing an amino group. In some embodiments of the present disclosure, A may be hydrogen or the moiety containing an alkyl group. The moiety A may comprise a substituted or un-substituted $C_2$-$C_4$ alkylene group and/or a substituted or un-substituted $C_1$-$C_3$ alkyl group. For example, the substi- (1) has a plurality of the moieties B, the plurality of the moieties B is identical or different.

In some embodiments of the present disclosure, the moiety G may be a moiety containing an ethyleneoxy group and an alkoxy group. The moiety G may be a moiety comprising substituted or un-substituted —(O—$C_2H_4$)— and —OR. R is a substituted or un-substituted $C_1$-$C_3$ alkyl group. For example, in some embodiments of the present disclosure, the moiety G may be —($C_3H_6$)—(O—$C_2H_4$)$_m$—OR, wherein R is a substituted or un-substituted $C_1$-$C_3$ alkyl group. m may be an integer of 3 to 10. In other words, m=3-10. Otherwise, m=3-8. g may be an integer of 0 to 75. In other words, g=0-75. Otherwise, g=1-30. Otherwise, g=1-6. Otherwise, g=1-5. Otherwise, g=1-4. If the compound represented by the formula (1) has a plurality of the moieties G, the plurality of the moieties G is identical or different.

In some embodiments of the present disclosure, the moiety J may be a moiety containing an ethyleneoxy group and a hydroxyl group. The moiety J may comprise substituted or un-substituted —(O—$C_2H_4$)— and -OH moieties. For example, the moiety J may be —($C_3H_6$)—(O—$C_2H_4$)$_n$—OH. n may be an integer of 8 to 12. In other words, n=8-12. n may be 3-8. j may be an integer of 0 to 75. In other words, j=0-75. Otherwise, j=0-30. Otherwise, j=1-5. Otherwise, j=1-4. Otherwise, j=0. If the compound represented by the formula (1) has a plurality of the moieties J, the plurality of the moieties J is identical or different.

For example, in an embodiment of the present disclosure, the moiety E may be an 3-epoxidepropoxypropyl group ($H_2C(O)CHCH_2O(CH_2)_3$—). The moiety T may be a trimethoxysilylethyl group (—$CH_2CH_2OSi(CH_3)_3$). The moieties A of different repeat units may be a methyl group (—$CH_3$) and hydrogen respectively. The moiety B may be a 4-phenethyl group (—$CH_2CH_2C_6H_5$). The moiety G may be —($C_3H_6$)—(O—$C_2H_4$)$_m$—$OCH_3$. The moiety J may be —($C_3H_6$)—(O—$C_2H_4$)$_n$—OH.

The modified polymethylhydrosiloxane may have a weight-average molecular weight of about 40,000.

<Solvent>

In some embodiments of the present disclosure, the polymerization reaction described above may proceed in existence of the solvent. The solvent may comprise an non-polar solvent such as an aliphatic hydrocarbon of pentane, hexane, heptane, etc.; an alicyclic hydrocarbon of cyclopentane, cyclohexane, methylcyclopentane, methylcyclohexane, etc.; an aromatic hydrocarbon of benzene, toluene, xylene, etc.; or a combination thereof, but is not limited thereto.

In addition, a surfactant may be added after the modifier reacts with the conjugated diene-vinyl aromatic hydrocarbon copolymer having the active end. In some embodiments of the present disclosure, for example, a composition of the surfactant may comprise dehydrated sorbitol oleate, dehydrated sorbitan monooleate, dehydrated sorbitol dioleate, dehydrated sorbitan trioleate, dehydrated sorbitan sesquioleate, chrysanthemum monocarboxylate, dehydrated sorbitol laurate, dehydrated sorbitol palmitate, dehydrated sorbitol stearate or any combination thereof.

The surfactant uses an oleate preferably. For example, in an embodiment of the present disclosure, the reaction may proceed with applying the commercially available SPAN®60 (dehydrated sorbitol stearate as the main component), SPAN®80 (dehydrated sorbitol monooleate as the main component), SPAN®85 (dehydrated sorbitan trioleate as the main component), manufactured by CRODA industrial chemical, or any combination thereof.

The terminal modified conjugated diene-vinyl aromatic hydrocarbon copolymer comprises the modified conjugated diene-vinyl aromatic hydrocarbon copolymer with the terminal having the at least one residue of the modifier.

In some embodiments of the present disclosure, the modified conjugated diene-vinyl aromatic hydrocarbon copolymer with the terminal having the at least one residue of the modifier has a content of 24 parts by weight to 64 parts by weight based on a total quantity of the terminal modified conjugated diene-vinyl aromatic hydrocarbon copolymer as 100 parts by weight.

In some embodiments of the present disclosure, a rubber composition is also provided. The rubber composition comprises carbon black, white carbon and the terminal modified conjugated diene-vinyl aromatic hydrocarbon copolymer described above.

In some embodiments of the present disclosure, a tire is also provided. The tire comprises the rubber composition described above.

Example

<Preparation for Modifier>

Firstly, 2025 g of n-hexane, 675 g of polymethylhydrosiloxane (PMHS) (having an weight-average molecular weight of about 24,000, and a hydrogen content of 0.3 wt %), 28 g of polyethylene glycol allyl methyl ether (Clariant, Polyglykol AM350, Mw=350, m=7), 104 g of allyl glycidyl ether, 15 g of vinyl trimethoxysilane, 89 g of styrene, and 40 g of allyl alcohol polyether (BASF, Pluriol A 10R, Mw=507, n=10) were added into a three necked reaction bottle, stirred and heated to 60° C.-70° C. Next, Pt catalyst of a proper amount was added. The reaction proceeded for 6 hours, and the distillation was performed for 1 hour. Then, the mixture was poured and cooled down to the room temperature. The concentration of the mixture was adjusted to be 20 wt % with n-hexane so as to obtain the modifier solution having the modifier B17 (embodiment). The modifier B17 (embodiment) is the modified polymethylhydrosiloxane represented by the formula (1). The conversion rate of SiH of the product measured by the NMR is about 90%. In the modifier B17 (embodiment), the repeat units having the moiety A comprise the functional group SiH of the reactant polymethylhydrosiloxane being not replaced or being remained through the reaction, and the original functional group $SiCH_3$ of the reactant polymethylhydrosiloxane. For the modifier B17 (embodiment), the moiety E is a 3-epoxidepropoxypropyl group; the moiety T is a trimethoxysilylethyl group; the moieties A of different repeat units are a methyl group and hydrogen respectively; the moiety B is a 4-phenethyl group; the moiety G is —($C_3H_6$)—(O—$C_2H_4$)$_m$—$OCH_3$; the moiety J is —($C_3H_6$)—(O—$C_2H_4$)$_n$—OH. The modifier B17 has a weight-average molecular weight of about 40,000.

The manufacturing methods for the modifier B18 (embodiment), the modifier B10 (comparative example), the modifier B11 (comparative example), the modifier B12 (comparative example) and the modifier B14 (comparative example) are similar with the manufacturing method for the modifier B17 (embodiment), except the amounts of the reactants (unit: g) as shown in the table 1.

TABLE 1

| modifier | B10 | B11 | B12 | B14 | B17 | B18 |
|---|---|---|---|---|---|---|
| n-hexane | | | 2025 | | | |
| polymethylhydrosiloxane | | | 675 | | | |
| polyethylene glycol allyl methyl ether | 350 | 84 | 0 | 84 | 28 | 42 |
| styrene | 0 | 103 | 51 | 72 | 89 | 94 |
| allyl glycidyl ether | 118 | 118 | 85 | 132 | 104 | 104 |
| vinyl trimethoxysilane | 0 | 0 | 0 | 0 | 15 | 23 |
| allyl alcohol polyether | 0 | 0 | 0 | 120 | 40 | 0 |

The modifier B17 (embodiment), the modifier B18 (embodiment), the modifier B10 (comparative example), the modifier B11 (comparative example), the modifier B12 (comparative example) and the modifier B14 (comparative example) may comprise the modified polymethylhydrosiloxane represented by the formula (1); wherein, the moiety E is a 3-epoxidepropoxypropyl group; the moiety T is a trimethoxysilylethyl group; the moieties A of different repeat units are a methyl group and hydrogen respectively; the moiety B is a 4-phenethyl group; the moiety G is —($C_3H_6$)—(O—$C_2H_4$)$_m$—$OCH_3$; the moiety J is —($C_3H_6$)—(O—$C_2H_4$)$_n$—OH, and mole numbers of which are listed in the table 2. The modifiers have a weight-average molecular weight of about 40,000.

TABLE 2

| mole number | modifier | | | | | |
|---|---|---|---|---|---|---|
| | embodiment | | comparative example | | | |
| | B17 | B18 | B10 | B11 | B14 | B12 |
| e | 22 | 22 | 25 | 25 | 28 | 18 |
| t | 3 | 3 | 0 | 0 | 0 | 0 |
| a | 350 | 350 | 350 | 345 | 343 | 370 |
| b | 21 | 22 | 0 | 24 | 17 | 12 |
| g | 2 | 3 | 25 | 6 | 6 | 0 |
| m | 7 | 7 | 7 | 7 | 7 | 0 |
| j | 2 | 0 | 0 | 0 | 6 | 0 |
| n | 10 | 0 | 0 | 0 | 10 | 0 |

Preparation for Terminal Modified Conjugated Diene-Vinyl Aromatic Hydrocarbon Copolymer

Copolymer Embodiment 1

Firstly, 800 g of cyclohexane as the solvent was added into the reaction tank, and the temperature of the reaction system was maintained at 45° C. Next, 0.64 g of 2,2-di(2-tetrahydrofuryl)propane (DTHFP) as a microstructural adjustment agent was added into the reaction tank. Then, divinylbenzene (DVB) of about 0.05 parts by weight was added. After the mixture was stirred for 10 minutes, 0.08 g of n-butyl lithium as the initiator for the polymerization reaction was added into the reaction tank. Next, 44.7 g of styrene as the vinyl aromatic hydrocarbon monomer units, and 168.3 g of 1,3-butadiene as the conjugated diene monomer units were added into the reaction tank to perform the polymerization reaction. Next, 7.46 g of 1,3-butadiene was added to take part in the reaction, and at this moment a specimen was took. After the solvent of the specimen was removed, the content of the 1,2-structure in the conjugated diene-vinyl aromatic hydrocarbon copolymer was measured by using the IR or NMR. The result of the measurement is that the 1,2-structure occupies 63 wt % of the whole butadiene structure units. In the conjugated diene-vinyl aromatic hydrocarbon copolymer, the styrene structure units occupy about 21 wt % of the whole of the butadiene structure units and the styrene structure units, and the butadiene structure units occupy about 79 wt % of the whole of the butadiene structure units and the styrene structure units.

After the reaction proceeded for about 5 minutes, the modifier B17 of 0.5 parts by weight based on the total quantity of the conjugated diene monomer units and the vinyl aromatic hydrocarbon monomer units as 100 parts by weight was added. After the reaction proceeded for 10 minutes, cyclohexane was removed with using hot water, and a drying was performed so as to obtain the terminal modified conjugated diene-vinyl aromatic hydrocarbon copolymer. The obtained terminal modified conjugated diene-vinyl aromatic hydrocarbon copolymer has a weight-average molecular weight of 600,000; and a number-average molecular weight of 340,000.

Copolymer Comparative Example 1

The manufacturing method for the terminal modified conjugated diene-vinyl aromatic hydrocarbon copolymer of the copolymer comparative example 1 is similar with the manufacturing method for the copolymer embodiment 1, except that the modifier uses the modifier B10.

Copolymer Embodiment 2

The copolymer embodiment 2 uses the polymerization reaction identical with the polymerization reaction of the copolymer embodiment 1 with using the same initial reactants and operation steps, but is different from the copolymer embodiment 1 in the modifiers used in the modifying step after the polymerization reaction.

Firstly, 800 g of cyclohexane as the solvent was added into the reaction tank, and the temperature of the reaction system was maintained at 45° C. Next, 0.64 g of 2,2-di(2-tetrahydrofuryl)propane as a microstructural adjustment agent was added into the reaction tank. Then, divinylbenzene of about 0.05 parts by weight was added. After the mixture was stirred for 10 minutes, 0.08 g of n-butyl lithium as the initiator for the polymerization reaction was added into the reaction tank. Next, 44.7 g of styrene as the vinyl aromatic hydrocarbon monomer units, and 168.3 g of 1,3-butadiene as the conjugated diene monomer units were added into the reaction tank to perform the polymerization reaction. Next, 7.46 g of 1,3-butadiene was added to take part in the reaction, and at this moment a specimen was took. After the solvent of the specimen was removed, the content of the 1,2-structure in the conjugated diene-vinyl aromatic hydrocarbon copolymer was measured by using the IR or NMR. The result of the measurement is that the 1,2-structure occupies 63 wt % of the whole butadiene structure units. In the conjugated diene-vinyl aromatic hydrocarbon copolymer, the styrene structure units occupy about 21 wt % of the whole of the butadiene structure units and the styrene structure units, and the butadiene structure units occupy about 79 wt % of the whole of the butadiene structure units and the styrene structure units.

After the reaction proceeded for about 5 minutes, a modifier I (having 1,1,3,3-tetramethyl-2-(3-trimethoxysilyl-propyl)-guanidine as the main component, manufactured by JNC Co., Ltd., Product ID: Sila-Ace® S340) as a first modifier of 0.05 parts by weight based on the total quantity of the conjugated diene monomer units and the vinyl aromatic hydrocarbon monomer units as 100 parts by weight was added. After the reaction proceeded for 10 minutes, the modifier B17 as a second modifier of 0.3 parts by weight based on the total quantity of the conjugated diene monomer units and the vinyl aromatic hydrocarbon monomer units as 100 parts by weight was added. After the reaction proceeded for 10 minutes, cyclohexane was removed with using hot water, and a drying was performed so as to obtain the terminal modified conjugated diene-vinyl aromatic hydrocarbon copolymer. The obtained terminal modified conjugated diene-vinyl aromatic hydrocarbon copolymer has a weight-average molecular weight of 630,000; and a number-average molecular weight of 345,000.

Copolymer Embodiment 3

The manufacturing method for the terminal modified conjugated diene-vinyl aromatic hydrocarbon copolymer of the copolymer embodiment 3 is similar with that of the copolymer embodiment 2, except that the second modifier uses the modifier B18.

Copolymer Comparative Example 2

The manufacturing method for the terminal modified conjugated diene-vinyl aromatic hydrocarbon copolymer of the copolymer comparative example 2 is similar with that of the copolymer embodiment 2, except that the second modifier uses the modifier B10.

Copolymer Comparative Example 3

The manufacturing method for the terminal modified conjugated diene-vinyl aromatic hydrocarbon copolymer of the copolymer comparative example 3 is similar with that of the copolymer embodiment 2, except that the second modifier uses the modifier B11.

Copolymer Comparative Example 4

The manufacturing method for the terminal modified conjugated diene-vinyl aromatic hydrocarbon copolymer of the copolymer comparative example 4 is similar with that of the copolymer embodiment 2, except that the second modifier uses the modifier B14.

Copolymer Comparative Example 5

The manufacturing method for the terminal modified conjugated diene-vinyl aromatic hydrocarbon copolymer of the copolymer comparative example 5 is similar with that of the copolymer embodiment 2, except that the second modifier uses the modifier B12.

The modifiers of the copolymer embodiments 1 to 3 and the copolymer comparative examples 1 to 3 are listed in the table 3.

TABLE 3

| (terminal-modified conjugated diene-vinyl aromatic hydrocarbon) copolymer | | | | | |
|---|---|---|---|---|---|
| | embodiment 1 | comparative example 1 | embodiment 2 | embodiment 3 | comparative example 2 | comparative example 3 |
| modifier | B17 | B10 | modifier I B17 | modifier I B18 | modifier I B10 | modifier I B11 |

<Preparation for Rubber Composition>

The rubber compositions are prepared with using the copolymers described above.

The terminal modified conjugated diene-vinyl aromatic hydrocarbon copolymer of the copolymer embodiment 1 of 80 parts by weight and the high-cis-conjugated diene polymer of 20 parts by weight and the following materials were blended in the Banbury mixer. White carbon (40 parts by weight), oil (10 parts by weight), the antioxidant (1 part by weight), carbon black (20 parts by weight), zinc oxide (3 parts by weight), stearic acid (2 parts by weight) were added into the Banbury mixer to be mixed. After the temperature was heated to 150° C., the mixture rubber was poured, and aged for 24 hours. The poured mixture rubber was put in the roller mixer, and N-Cyclohexyl-2-benzothiazolesulfenamide (CBS) of 1.8 parts by weight, 1,3-diphenylguanidine (DPG) of 1.7 parts by weight, and sulfur of 1.7 parts by weight were added to perform vulcanization so as to manufacture the rubber composition (i.e. the composition embodiment 1).

Similar with the manufacturing method for the rubber composition of the composition embodiment 1 prepared with using the copolymer embodiment 1, the rubber compositions of the composition embodiment 2, the composition embodiment 3, the composition comparative example 1, the composition comparative example 2 and the composition comparative example 3 are respectively prepared with using the terminal modified conjugated diene-vinyl aromatic hydrocarbon copolymers of the copolymer embodiment 2, the copolymer embodiment 3, the copolymer comparative example 1, the copolymer comparative example 2 and the copolymer comparative example 3.

The information of the materials used for preparing the rubber compositions are as the following:

white carbon (Silica, 7000GR, manufactured by ULTRASIL EVONIK)
oil (Treated Distillate Aromatic Extract, TDAE, Vivtec 500, manufactured by H&R)
antioxidant (IRGANOX® 1076, manufactured by CIBA)
carbon black (ISAF-HS N234, manufactured by CHINA SYNTHETIC RUBBER CORPORATION)
ZnO (manufactured by HA)
stearic acid (TPSA1865)
N-Cyclohexyl-2-benzothiazole sulfenamide (CBS, manufactured by FLEXSYS)
Diphenyl guanidine (DPG, manufactured by FLEXSYS)
sulfur (Triangle brand)
high-cis-conjugated diene polymer (PR040, manufactured by Chi Mei Corporation)

<Evaluation>

The table 4 lists the test results of the composition embodiment 1 and the composition comparative example 1. The table 5 lists the test results of the composition embodiment 2, the composition embodiment 3, the composition comparative example 2, the composition comparative example 3, the composition comparative example 4, and the composition comparative example 5. The table 4 and the table 5 also list the modifiers of the composition embodiments and the composition comparative examples, and the mole numbers of the modified polymethylhydrosiloxane represented by the formula (1) comprised by the modifier B10, the modifier B11, the modifier B12, the modifier B14, the modifier B17, and the modifier B18.

TABLE 4

| | (rubber) composition | |
|---|---|---|
| | embodiment 1 | comparative example 1 |
| modifier | B17 | B10 |
| e | 22 | 25 |
| t | 3 | 0 |
| a | 350 | 350 |
| b | 21 | 0 |
| g | 2 | 25 |
| m | 7 | 7 |
| j | 2 | 0 |
| n | 10 | 0 |
| Tanδ (0° C.) Index (%) | 98.8 | 100 |
| Tanδ (60° C.) Index (%) | 106.8 | 100 |
| total value | 205.7 | 200 |

TABLE 5

| | (rubber) composition | | | | | |
|---|---|---|---|---|---|---|
| | embodiment 2 | embodiment 3 | comparative example 2 | comparative example 3 | comparative example 4 | comparative example 5 |
| modifier | modifier I B17 | modifier I B18 | modifier I B10 | modifier I B11 | modifier I B14 | modifier I B12 |
| e | 22 | 22 | 25 | 25 | 28 | 18 |
| t | 3 | 3 | 0 | 0 | 0 | 0 |
| a | 350 | 350 | 350 | 345 | 343 | 370 |
| b | 21 | 22 | 0 | 24 | 17 | 12 |
| g | 2 | 3 | 25 | 6 | 6 | 0 |
| m | 7 | 7 | 7 | 7 | 7 | 0 |
| j | 2 | 0 | 0 | 0 | 6 | 0 |
| n | 10 | 0 | 0 | 0 | 10 | 0 |
| Tanδ (0° C.) Index (%) | 104.7 | 101.2 | 100 | 100 | 100 | 104.9 |
| Tanδ (60° C.) Index (%) | 103.2 | 106.6 | 100 | 100 | 104.2 | 98.0 |
| total value | 207.9 | 207.8 | 200 | 200 | 204.2 | 202.9 |

The character of each of the rubber compositions was tested by using the viscoelasticity testing device of model DMA Q800 manufactured by TA Instrument Company. The testing mode was stretching mode. The testing frequency was 20 Hz. The testing item was the tangent (Tan δ), which is the ratio of the loss modulus to the storage modulus. The heating rate for testing the tangent was 3° C./min. In addition, the temperatures selected for testing the tangent was 0° C. and 60° C. A higher tangent at 0° C. (Tan δ (0° C.)) indicates a rubber composition has a better wet skid resistance. A lower tangent at 60° C. (Tan δ (60° C.)) indicates a rubber composition has a lower rolling resistance, and a tire applying the rubber composition consumes less fuel of a transporting vehicle. As to the composition embodiment 1 and the composition comparative example 1 using the single kind of the modifier, Tan δ (60° C.) index of which are calculated by dividing the measured value of the composition comparative example 1 by the measured values of the composition embodiment 1 and the composition comparative example 1 respectively, and then multiplying which by 100%. In other words, Tan δ (60° C.) index=[the measured value of the composition comparative example 1/the individual measured values of the composition embodiment 1 and the composition comparative example 1]×100%.

As to the composition embodiments 2 to 3 and the composition comparative examples 2 to 5 using the two kinds of the modifiers, Tan δ (60° C.) index of which are calculated by dividing the measured value of the composition comparative example 2 (equal to the measured value of the composition comparative example 3) by the measured values of the composition embodiments 2 and 3 and the composition comparative examples 2 to 5 respectively, and then multiplying which by 100%. In other words, Tartδ (60° C.) index=[the measured value of the composition comparative example 2/the individual measured values of the composition embodiments 2 and 3 and the composition comparative examples 2 to 5]×100%.

A higher value of Tan δ (60° C.) index indicates a rubber composition has a lower rolling resistance, and a tire applying the rubber composition consumes less fuel of a transporting vehicle. From the experimental results in the table 4 and the table 5, it could be observed that the tangents at 60° C. of the rubber compositions of the composition embodiment 1, the composition embodiment 2 and the composition embodiment 3 are higher than those of the composition comparative example 1, the composition comparative example 2 and the composition comparative example 3. It indicates that the rubber compositions manufactured from the terminal modified conjugated diene-vinyl aromatic hydrocarbon copolymers prepared with applying the modifier B17 and the modifier B18 of the embodiments have the lower rolling resistance, and consume less fuel of transporting vehicles when applying in tires.

As to the composition embodiments 2 to 3 and the composition comparative examples 2 to 5 with using the two kinds of the modifiers, Tan δ (0° C.) index of which are calculated by respectively dividing the measured values of the composition embodiments 2 to 3 and the composition comparative examples 2 to 5 by the measured value of the composition comparative example 2 (equal to the measured value of the composition comparative example 3), and then multiplying which by 100%. In other words, Tan δ (0° C.) index=[the individual measured values of the composition embodiments 2 to 3 and the composition comparative examples 2 to 5/the measured value of the composition comparative example 2]×100%).

A higher value of Tan δ (0° C.) index indicates a rubber composition has a better wet skid resistance. From the experimental results in the table 5, it can be observed that the tangents at 0° C. of the rubber compositions of the composition embodiment 1, the composition embodiments 2 and 3 are higher than those of the composition comparative examples 2 to 4. It indicates the rubber compositions manufactured from the terminal modified conjugated diene-vinyl aromatic hydrocarbon copolymers prepared with applying the modifier B17 and the modifier B18 of the embodiments have better wet skid resistance distinctly.

A larger total value of the Tan δ (0° C.) index and the Tan δ (60° C.) index (i.e. Tan δ (0° C.) index+Tan δ (60° C.) index) indicates a better comprehensive evaluation of the rolling resistance and the wet skid resistance. From the experimental results in the table 4 and the table 5, it can be observed that the terminal modified conjugated diene-vinyl aromatic hydrocarbon copolymers/the rubber compositions prepared with using the modified polymethylhydrosiloxanes of the embodiments have better comprehensive physical properties of the rolling resistance and the wet skid resistance.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A modified polymethylhydrosiloxane, comprising a compound represented by a formula (1),

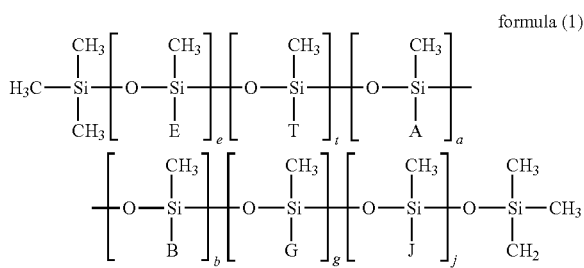

formula (1)

wherein, E is a moiety containing an epoxide group,
T is a moiety containing an alkoxysilylalkyl group,
A is selected from the group consisting of hydrogen, a moiety containing an alkyl group, and a moiety containing an amino group,
B is a moiety containing an aryl group,
G is a moiety containing an ethyleneoxy group and an alkoxy group,
J is a moiety containing an ethyleneoxy group and a hydroxyl group,
$e=5\text{-}45$, $t=1\text{-}4$, $a+b+g+j$ is equal to 1 to 595, and the moieties E are identical or different, the moieties T are identical or different, the moieties A are identical or different, the moieties B are identical or different, the moieties G are identical or different, the moieties J are identical or different.

2. The modified polymethylhydrosiloxane according to claim 1, wherein $a=170\text{-}400$, $b=0\text{-}45$, $g=1\text{-}30$, $j=0\text{-}75$.

3. The modified polymethylhydrosiloxane according to claim 2, wherein $e=19\text{-}24$.

4. The modified polymethylhydrosiloxane according to claim 2, wherein $g=1\text{-}5$, the moiety G is —$(C_3H_6)$—$(O$—$C_2H_4)_m$—OR, R is a substituted or un-substituted $C_1$-$C_3$ alkyl group, $m=3\text{-}10$.

5. The modified polymethylhydrosiloxane according to claim 2, wherein $t=3\text{-}4$.

6. The modified polymethylhydrosiloxane according to claim 2, wherein the moieties A are hydrogen, or a substituted or un-substituted $C_2$-$C_4$ alkylene group, and/or a substituted or un-substituted $C_1$-$C_3$ alkyl group.

7. The modified polymethylhydrosiloxane according to claim 2, wherein the moiety B is a substituted or un-substituted $C_6$-$C_{16}$ hydrocarbyl group containing an aryl group.

8. The modified polymethylhydrosiloxane according to claim 2, wherein $j=1\text{-}5$, the moiety J is —$(C_3H_6)$—$(O$—$C_2H_4)_n$—OH, $n=8\text{-}12$.

9. The modified polymethylhydrosiloxane according to claim 1, wherein the moiety E is a 3-epoxidepropoxypropyl group, the moiety T is a trimethoxysilylethyl group, the moieties A of different repeat units are a methyl group and hydrogen respectively, the moiety B is a 4-phenethyl group, the moiety G is —$(C_3H_6)$—$(O$—$C_2H_4)_m$—OCH$_3$, the moiety J is —$(C_3H_6)$—$(O$—$C_2H_4)_n$—OH, $m=3\text{-}10$, $n=8\text{-}12$.

10. A synthesis method for a terminal modified conjugated diene-vinyl aromatic hydrocarbon copolymer, comprising:
performing a polymerization step reacting conjugated diene monomer units with vinyl aromatic hydrocarbon monomer units to yield a conjugated diene-vinyl aromatic hydrocarbon copolymer having an active end; and
reacting the conjugated diene-vinyl aromatic hydrocarbon copolymer having the active end with a modifier to yield the terminal modified conjugated diene-vinyl aromatic hydrocarbon copolymer, wherein the modifier comprises the modified polymethylhydrosiloxane according to claim 1.

11. A terminal modified conjugated diene-vinyl aromatic hydrocarbon copolymer, comprising:
a modified conjugated diene-vinyl aromatic hydrocarbon copolymer with a terminal having at least one residue of a modifier;
wherein the modifier comprises the modified polymethylhydrosiloxane according to claim 1.

12. A rubber composition, comprising:
a carbon black;
a white carbon; and
the terminal modified conjugated diene-vinyl aromatic hydrocarbon copolymer according to claim 11.

13. A tire, comprising the rubber composition according to claim 12.

* * * * *